(12) United States Patent
ji (10) Patent No.: US 7,172,075 B1
(45) Date of Patent: *Feb. 6, 2007

(54) DEFECT FREE COMPOSITE MEMBRANES, METHOD FOR PRODUCING SAID MEMBRANES AND USE OF THE SAME

(75) Inventor: jiang ji, Salem, NH (US)

(73) Assignee: Accord Partner Limited, Hong Kong (HK)

( * ) Notice: Subject to any disclaimer, the term of this patent is extended or adjusted under 35 U.S.C. 154(b) by 332 days.

This patent is subject to a terminal disclaimer.

(21) Appl. No.: 10/604,664

(22) Filed: Aug. 8, 2003

(51) Int. Cl.
*B01D 29/00* (2006.01)
*B01D 39/00* (2006.01)
*B01D 67/00* (2006.01)
*B01D 63/02* (2006.01)
*B01D 39/14* (2006.01)
*B01D 53/22* (2006.01)

(52) U.S. Cl. ............ 210/490; 210/500.23; 210/500.27; 210/500.36; 210/500.43; 210/500.29; 210/500.34

(58) Field of Classification Search ................. 210/490, 210/500.27, 500, 500.36, 500.41, 500.42, 210/500.35, 198.2, 500.34, 500.43, 500.3, 210/500.29, 500.23; 264/41, 216; 428/315.7, 428/310.5; 427/244, 245; 96/4
See application file for complete search history.

(56) References Cited

U.S. PATENT DOCUMENTS

| | | | | |
|---|---|---|---|---|
| 602,872 A | * | 4/1898 | Richards et al. ............ 205/342 |
| 635,444 A | * | 10/1899 | Meyrowitz et al. ......... 351/227 |
| 3,556,305 A | * | 1/1971 | Shorr .......................... 210/490 |
| 3,676,193 A | * | 7/1972 | Cooper, IV et al. ........ 427/230 |
| 4,061,821 A | * | 12/1977 | Hayano et al. ............... 428/37 |
| 4,118,354 A | * | 10/1978 | Harada et al. .............. 524/711 |
| 4,645,602 A | * | 2/1987 | Barnes, Jr. et al. ......... 210/490 |
| 4,690,765 A | * | 9/1987 | Linder et al. ............... 210/654 |
| 4,690,766 A | * | 9/1987 | Linder et al. ............... 210/654 |
| 4,740,562 A | * | 4/1988 | Menke et al. ............... 525/366 |
| 4,774,039 A | * | 9/1988 | Wrasidlo ...................... 264/41 |
| 4,941,976 A | * | 7/1990 | Bartels et al. .............. 210/490 |
| 5,009,824 A | * | 4/1991 | Walch et al. ............... 264/45.1 |
| 5,013,767 A | * | 5/1991 | Malon et al. ................. 521/64 |
| 5,022,990 A | * | 6/1991 | Doi et al. .............. 210/500.42 |
| 5,032,331 A | * | 7/1991 | Onishi et al. ................. 264/48 |

(Continued)

FOREIGN PATENT DOCUMENTS

WO  WO2005/014266  * 2/2005

*Primary Examiner*—Ana Fortuna
(74) *Attorney, Agent, or Firm*—Bromberg & Sunstein LLP (57) ABSTRACT

A defect free semipermeable composite membrane having outstanding integrity and high water permeability is provided. Said composite membrane comprises an inside support layer to provide sufficient mechanical strength, an outside barrier layer to provide selective separation and a middle layer to provide both chemical and physical binding between the support and the barrier layer. Two different methods for making said defect free composite membrane are discovered. These methods have been successfully used to produce high quality coatings and defect free composite membranes, which are independent of chemical composition and physical structure of said support. In the present invention, the ultrasonic sonication is utilized to speed up the phase inversion process of a membrane casting solution, and to produce a composite membrane at a speed higher than that disclosed in the prior art. Said defect free composite membranes have broad applications, ranging from filtration of fruit juice, wine and milk to purification of drinking water, municipal and industrial wastewater.

8 Claims, 3 Drawing Sheets

U.S. PATENT DOCUMENTS

| | | | |
|---|---|---|---|
| 5,034,129 A * | 7/1991 | Ten Hove | 210/490 |
| 5,066,401 A * | 11/1991 | Muller et al. | 210/500.35 |
| 5,085,676 A * | 2/1992 | Ekiner et al. | 96/13 |
| 5,209,849 A * | 5/1993 | Hu et al. | 210/490 |
| 5,282,971 A * | 2/1994 | Degen et al. | 210/645 |
| 5,418,053 A * | 5/1995 | Lin | 428/304.4 |
| 5,472,607 A * | 12/1995 | Mailvaganam et al. | 210/490 |
| 5,834,107 A * | 11/1998 | Wang et al. | 428/310.5 |
| 5,888,605 A * | 3/1999 | Hachisuka et al. | 428/71 |
| 5,914,039 A * | 6/1999 | Mahendran et al. | 210/500.25 |
| 6,024,872 A | 2/2000 | Mahendran et al. | |
| 6,146,747 A * | 11/2000 | Wang et al. | 428/310.5 |
| 6,354,444 B1 * | 3/2002 | Mahendran et al. | 210/490 |
| 6,595,167 B2 * | 7/2003 | Kaesgen | 123/55.2 |
| 6,596,167 B2 * | 7/2003 | Ji et al. | 210/500.42 |

* cited by examiner

DEFECT FREE COMPOSITE MEMBRANES, METHOD FOR PRODUCING SAID MEMBRANES AND USE OF THE SAME

CROSS REFERENCE TO RELATED APPLICATIONS

Not Applicable.

FEDERAL RESEARCH STATEMENT

Not Applicable.

BACKGROUND OF INVENTION

The present invention relates to the field of semipermeable membranes, which are useful in liquid and gas separation by filtration, dialysis and the like.

An industrial membrane should have a high permeability, sufficient mechanical strength and excellent chemical stability to give a high productivity and a long service time. The chemical stability of membrane is mainly determined by chemical composition of membrane materials. Membrane permeability and mechanic strength not only depend on membrane chemical composition, but also strongly depend on membrane physical structure, which is primarily determined by the process utilized to make the membrane.

It is well know that the thinner the membrane, the higher the membrane permeability, however, the thinner the membrane, the weaker the membrane. In order to obtain both high membrane permeability and sufficient mechanical strength, a composite membrane approach has been used. In general, a composite membrane comprises a thin film layer and a support. The thin film layer (referred to herein as a membrane) provides a separation barrier, which allows lower flow resistance to increase permeability, and the support provides mechanical strength to a composite membrane.

U.S. Pat. No. 4,061,821 discloses a method of coating a hollow braid with a polyacrylonitrile solution to form a braid-supported hollow fiber membrane, which shows a higher mechanical strength and a higher stability to hot water treatment than the self-supported polyacrylonitrile membrane having no braid support at all.

In water treatment, a bleach containing sodium hypochlorite as a free chlorine source is often used for membrane cleaning and water disinfections. Polyacrylonitrile based membranes disclosed in U.S. Pat. No. 4,061,821 are not stable to chlorine attack. However, this problem can be overcome by using a poly(vinylidene fluoride) (PVDF) based membrane, which is relatively stable to free chlorine attack. U.S. Pat. No. 5,472,607 discloses a method of coating a tubular braid with a PVDF solution to form a braid reinforced hollow fiber membrane. The PVDF solution only coats the outside surface of the braid without penetrating into the braid wall. The membranes obtained are stable to 2000 ppm of free chlorine at ambient temperature. Unfortunately, the membranes disclosed in U.S. Pat. No. 5,472,607 have very low water permeability. U.S. Pat. No. 5,914,039 discloses a method, in which partially hydrolyzed poly(vinyl acetate) and calcined $\alpha$-alumina particles are added to give a braid supported membrane, which shows a higher pure water permeability than the corresponding membrane having no calcined $\alpha$-alumina particles. However, this membrane shows a severe fouling problem in wastewater treatment, because the calcined $\alpha$-alumina particles in the membrane are excellent absorbents, which have very large surface area and a high tendency to absorb impurities from feed solutions to reduce membrane flux. To minimize the membrane fouling problem, the above membrane is operated under frequent back flush, which is often found to cause membrane delaminated, i.e. the membrane is peeled off the braid surface by back flush. A variety of materials, such as polyester, fiber glass and nylon, are used to make a tubular hollow braid. It is found that fiber glass braid shows a more severe membrane delamination problem than polyester and nylon braids due to poor membrane adhesion to the surface of fiber glass braid. U.S. Pat. No. 6,354,444 discloses a physical method to tackle membrane delamination problem, i.e., using different type of braid as a membrane support, which has different braiding patterns, such as regular, hercules and diamond. It is found that the diamond braid having tighter weaves than the regular and hercules braids gives an improved membrane adhesion. However, the membrane delamination problem remains.

In the prior art, the coating quality strongly depends on the braid quality. For example, broken fibers protruding from the surface of tubular braid caused an uneven coating around the broken fibers to form pin holes. According to U.S. Pat. No. 6,354,444, a braid used as a membrane support must have proper weaves. Too open weave causes the filament (fiber) embedded by a polymeric coating material to give a low membrane permeability, and too tight weave causes poor membrane adhesion to the braid surface, the membrane is often found to be peeled off the braid surface by back flush.

Furthermore, the membrane casting solutions in the prior art is unstable and difficult to make to give a poor reproducibility. For example, a hydrophilic component (HPVA) used in a membrane casting solution in U.S. Pat. Nos. 5,472,607, 5,914,039, and 6,354,444 is made by partial hydrolysis of OLE_LINK3poly(vinyl acetate)OLE_LINK3. Concentrated sulfuric acid is used as a catalyst, the reaction is carried out over a long time period at an elevated temperature. The degree of hydrolysis is very difficult to control, and varies from batch to batch. U.S. Pat. No. 6,024,872 discloses a method of making a dope containing calcined $\alpha$-alumina particles, which causes an even more severe problem than the partial hydrolysis of poly(vinyl acetate), because the calcined $\alpha$-alumina particles are partially precipitated out of the membrane casting solution during storage, the degree of precipitation varies with time, resulting in a non uniform coating and poor membrane reproducibility.

The highest speed disclosed in the prior art for coating a braid is 40 ft/min, it is relatively low and should be improved for a higher productivity.

The present invention is designed to resolve the problems in the prior art.

SUMMARY OF INVENTION

It is an object of the present invention to provide a defect free semipermeable composite membrane having its barrier layer strongly bonded to the support.

It is another object of the present invention to provide method, which can strengthen the binding between the barrier layer and the support of a composite membrane to prevent the membrane from peeling off the support during back flush cleaning.

It is another object of the present invention to provide a spinneret, which has a multiple inlets allowing simultaneously coating a tubular support with multiple layers to give a defect free composite membrane.

It is another object of the present invention to provide an effective coating method to give a high quality coating and a defect free membrane, which is independent of chemical composition and physical structure of the support, especially, independent of braiding patterns, such as regular, hercules and diamond.

It is another object of the present invention to make a stable membrane casting solution containing organic particles, which do not precipitate out of the solution during storage.

It is another object of the present invention to provide a method, which can enhance mass transfer and speed up phase inversion of a membrane casting solution to produce a composite membrane at a speed higher than those disclosed in the prior art.

It is further object of the present invention to demonstrate a method of utilizing the defect free semipermeable composite membranes.

It has been discovered in the present invention that a composite hollow fiber membrane has a high water permeability, and strong physical and chemical binding between the membrane and the support, the membrane does not burst or peel off the support under a back pressure higher than 100 psi. In the present invention, the binding between the membrane and the support of a composite membrane is strengthened by two different methods: (1) physical method, in which the vacuum suction is applied to the inside of support to draw a coating solution towards support surface, resulting in a strong physical adhesion between membrane and support, and (2) chemical method, in which a permeable adhesive layer is added between the membrane and the support to chemically bond them together during membrane formation.

According to the present invention, a new type of spinneret is disclosed, which has one inlet for vacuum suction and at least two other inlets to provide different coating solutions for simultaneously coating a support with multiple layers to form a composite hollow fiber membrane. In the present invention, a strong tubular support, such as braid, knitted tube, and extruded hollow fiber, is used to provide mechanical strength. The tubular support is coated with multiple layers when passing through the spinneret. The first coating solution could be an adhesive, such as epoxy, polyurethane and silicone, or any other solution, which has excellent compatibility with both the support and the second coating solution to bond them together to prevent the membrane from delamination. The first coating solution may or may not be the same as the second coating solution.

In the prior art, an effort is made to improve adhesion between membrane and support by emphasizing physical structure of the support, i.e. using different type of braids having different braiding patterns. In the present invention, the coating quality and the adhesion between membrane and support are controlled at a higher level, which goes beyond the physical structure of support, in other word, the coating quality and the adhesion between membrane and support are independent of physical structure and chemical composition of the support. This is achieved by simultaneously coating a support with multiple layers. The first coating layer not only covers all the defects and roughness of the support, including broken filament protruding from the support surface, but also provides a smooth surface and strong adhesion for a second coating layer, which is formed by coating on top of the first layer in a single step to give a high quality coating, which is in turn solidified in a coagulation bath to form a composite membrane.

According to the present invention, a method is disclosed to make a stable membrane casting solution, which comprises a hydrophobic polymer as a major component, a hydrophilic polymer as a minor component and organic particles as pore formers. The hydrophobic polymer provides the membrane with excellent chemical stability, the hydrophilic polymer provides a hydrophilic surface property and organic particles provide high porosity. In contrast to the prior art, there are no hydrolysis of poly(vinyl acetate) and no calcined $\alpha$-alumina particles in the present invention. The organic particles used in the present invention, do not precipitate out of solution, thus the membrane casting solution of the present invention is very stable during storage. It gives a much better control in coating quality and reproducibility than the prior art. The use of a commercially available hydrophilic polymer allows avoid the time consuming hydrolysis reaction used in the prior art, reduce manufacturing cost and increase productivity.

Furthermore, in the present invention the ultrasonic sonication is utilized in the coagulation bath, primary and secondary leaching baths to enhance mass transfer and to speed up phase inversion. The use of ultrasonic sonication allows produce a composite membrane at a speed higher than that disclosed in the prior art.

BRIEF DESCRIPTION OF DRAWINGS

The present invention can be illustrated with the assistance of the following drawings.

DETAILED DESCRIPTION

The present invention has a number of features, which are more advanced than the prior art. These advances are described in details in this section and defined in the appended claims.

According to the present invention, a process for producing a composite membrane comprises preparing a heterogeneous coating solution (dope) containing 8–55% by weight of hydrophobic polymers and 1–50% by weight of hydrophilic polymers, 1–50% by weight of polymer particles as additives, 1–30% by weight of other organic and inorganic additives, and the remaining solvent to make a total percentage of 100, coating a support with a viscous liquid, which is selected from the group consisting of said dope, epoxy, polyurethane, silicone, and any other adhesive, to cover the rough surface and defects of said support and to provide a smooth surface and binding for a second coating, coating said support again with either the same solution used for the first coating or a different polymer coating solution, coagulating said polymer coating layers on top of said support to form a defect free composite membrane in a coagulation bath equipped with an ultrasonic device, which generates ultrasonic vibration to enhance mass transfer and to speed up phase inversion from liquid to solid phase of said coating layers, removing said solvents and water soluble additives from said coagulated membrane in a leaching bath equipped with an ultrasonic device to enhance mass transfer, collecting said composite membrane at a speed of 5 to 600 feet per minute with a take-up wheel immersed in a water bath equipped with an ultrasonic device to remove chemical residuals from said membrane, switching to another take-up wheel when one wheel is full to continue collecting said membrane around clock, curing said membrane either at ambient temperature or at an elevated temperature depending on the adhesives utilized to bond said support and said membrane together, and optionally treating said composite membrane with a bleach containing 50 ppm to 120,000 ppm free chlorine at ambient or elevated temperature to increase membrane water permeability by 2 to 10 folds compared to a control membrane never exposed to a chlorine treatment.

Figure 1:
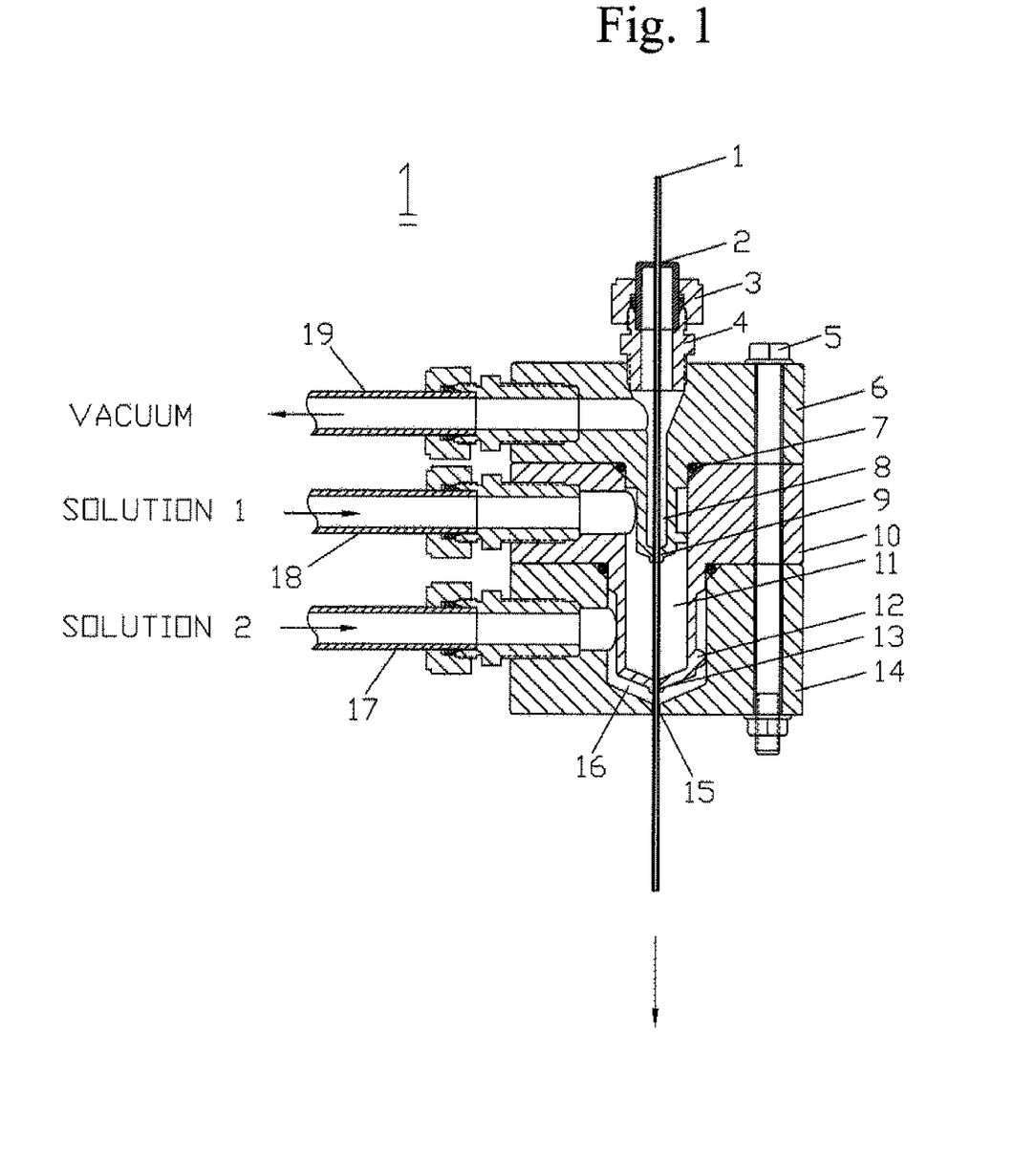
FIG. 1 is the drawing of a new type of spinneret of the present invention.

According to the present invention, a novel composite hollow fiber membrane is obtained by coating a tubular support with multiple layers using a special designed spinneret 1 as shown in FIG. 1. The spinneret has two inlets 17 and 18, for two different coating solutions. A tubular support 1 enters the spinneret through a small hole 2 located at the top of the spinneret, and hole 9 in the middle. Both hole 2 and 9 play a role in controlling the tension and alignment of support 1. A tubular support may deform during shipment and storage to give an oval cross section, hole 2 and 9 can make the deformed tubular support restore to its original prefect circular shape. When the support 1 passes through a small hole 9, it is coated with the first coating solution in chamber 11. Vacuum suction is provided through inlet 19, it draws the coating solution towards the support to give a strong adhesion between the support and the coating. The first coating solution could be an adhesive, such as epoxy, polyurethane, and silicone, or a polymer solution, which has excellent compatibility with both the support and the membrane to bond them together. After passing through another hole 13, the support coated with the first coating solution is in turn coated with the second solution in chamber 16. The coating thickness is controlled by hole 15. The first coating solution may or may not be the same as the second coating solution depending on desired membrane performance.

Figure 2:
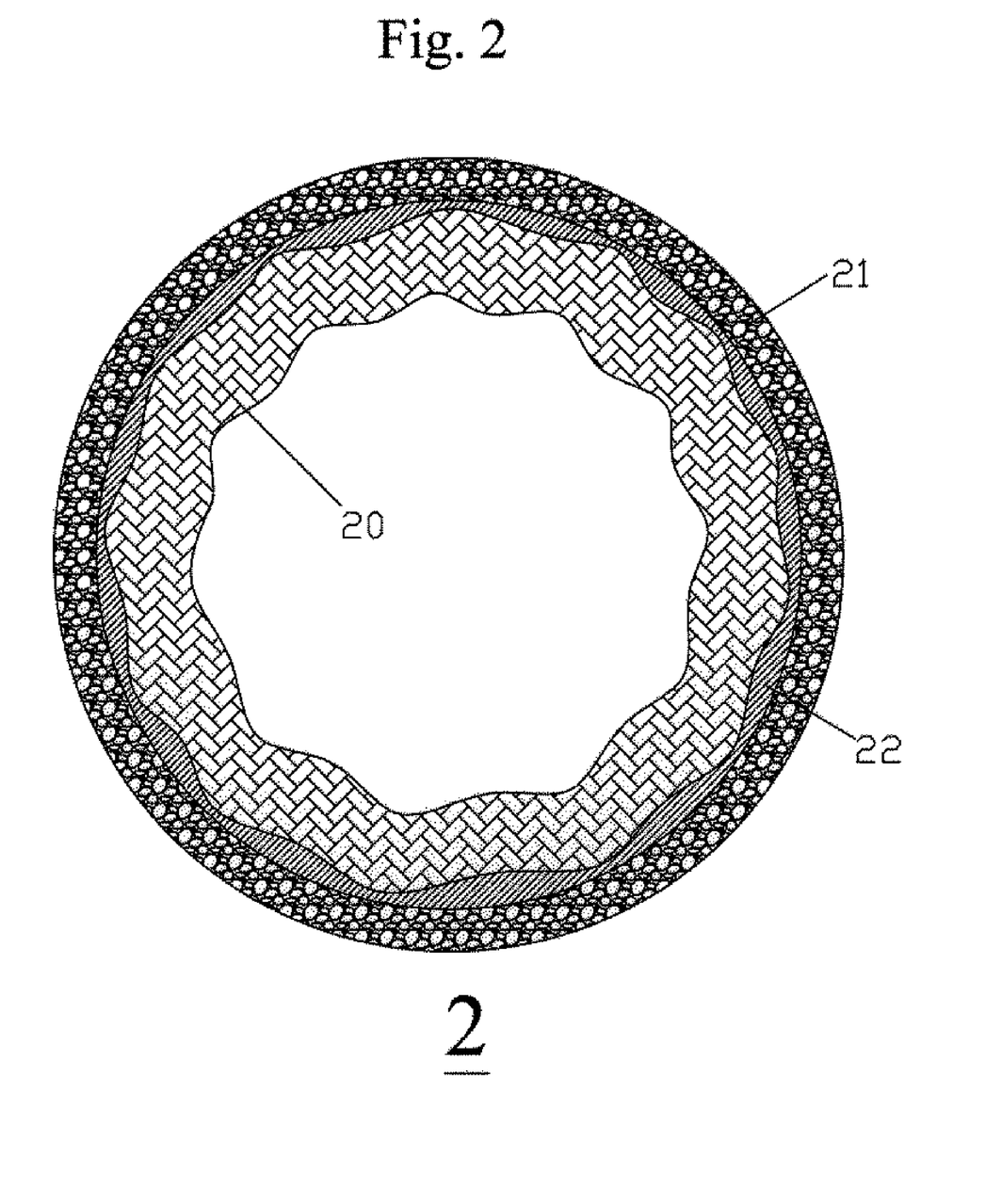
FIG. 2 is the cross section view of a composite hollow fiber membrane of the present invention.

A typical cross section view 2 of a composite membrane obtained in the present invention is schematically shown in FIG. 2. It comprises three different layers. Inside layer 20, represents a porous support, which could be a braid, knitted tube, extruded hollow fiber and any other hollow tubular material, which has either smooth or rough surface. The support layer provides mechanical strength to a composite membrane. Outside layer 21 represents a membrane, which provides a barrier for separation. Middle layer 22 represents a permeable binding layer, which can be an adhesive, such as epoxy, polyurethane, silicone, and any other chemical, which provides binding between the support and the membrane. The beauty of multiple coating layers in the present invention is that the first coating layer not only covers the surface roughness and defects that the support may have to provide a smooth surface for a second coating, but also provides binding between the support and the membrane. The first coating layer is porous and has negligible resistance to liquid permeation. If the first and the second coating layers are made from the same coating solution, the interface between them disappears to give a perfect compatibility.

Figure 3:
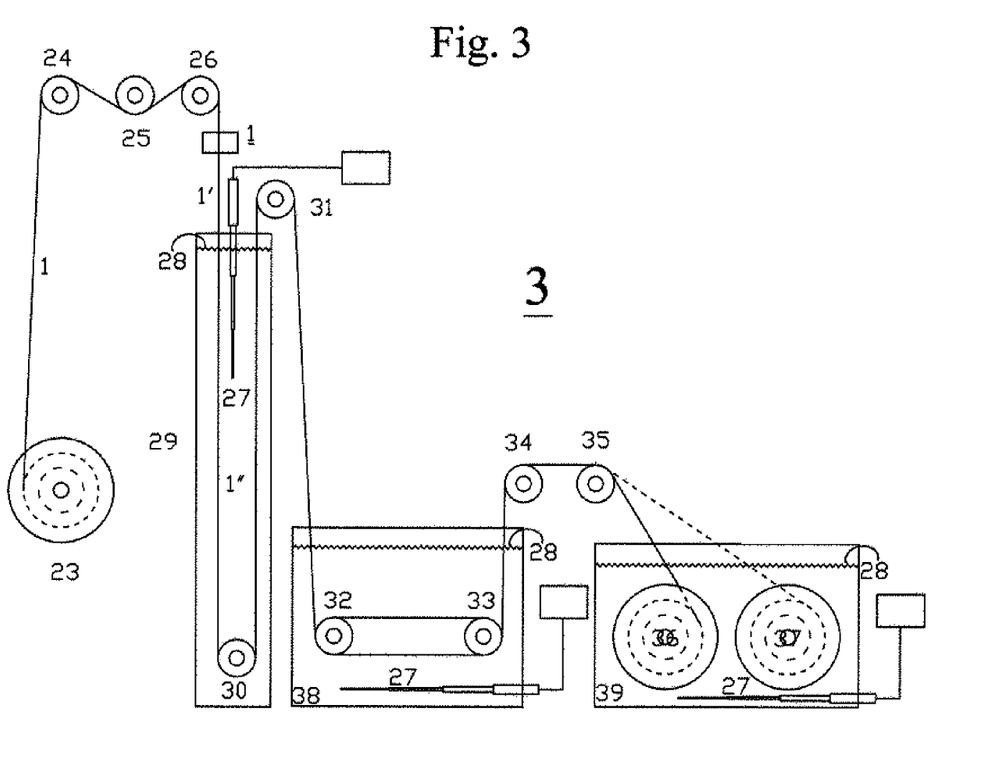
FIG. 3 is the schematic illustration of a novel process for making a composite membrane in the present invention.

A system utilized for coating a tubular support to form a composite hollow fiber membrane is schematically shown in FIG. 3. The fiber coating system comprises a fiber unwound station 23, a set of rollers 24–26, a spinneret 1, a coagulation (gelation) bath 29, a primary leaching bath 38, a secondary leaching bath 39, a set of motorized rollers 30–35, and two fiber take-up wheels 36 and 37, immersed in the secondary leaching bath 39. An ultrasonic sonicator 27 is installed in the coagulation bath 29. It can also be installed in the primary and secondary leaching baths, but it is optional depending on needs.

A general process for making a composite hollow fiber membrane is also illustrated in FIG. 3. A tubular support 1 in the present invention could be a tubular braid, knitted tube, extruded hollow fiber and any other material having a tubular geometry. For an illustration purpose, a hollow tubular braid is used as an example. Hereafter, the support 1 in FIGS. 1 and 3 is referred to a hollow tubular braid, or braid for brevity. A braid 1 from spool 23 is guided through a set of rollers 24–26, which control braid tension prior to coating. A tubular braid 1 is coated by two polymer solutions when passing through spinneret 1. A detail illustration of coating process inside the spinneret is given in FIG. 1. When the braid 1 passes through a small hole 9, it is coated in chamber 11 by the first coating solution, which could be an adhesive, such as epoxy, polyurethane, and silicone, or a polymer solution, which has excellent compatibility with both the braid and membrane to bond them together. In Examples 1–3, the first coating solution is the same as the second coating solution. The first coating layer covers all the defects of the braid, including broken filament protruding out of the braid surface. The first coating provides a smooth surface and strong binding for the second coating. After passing through hole 13, the adhesive coated braid is in turn coated with the second coating solution in chamber 16 of spinneret 1. In Examples 1–3 of the present invention, the second coating solution contains a fluoro polymer as a major component and a hydrophilic polymer as a minor component, and polymer particles as pore formers, which will be permanently anchored in the membrane matrix. The coating thickness is controlled by hole 15. The polymer coated braid is allowed travel a very short distance, such as 4 inches, in air before entering coagulation bath 29, where polymer phase inversion from liquid to solid takes place to form a composite hollow fiber membrane. An ultrasonic probe 27, which can generate ultrasonic vibration, is installed in coagulation bath 29 to enhance mass transfer between the coagulation media and newly formed membrane to efficiently remove solvent and additives from the membrane. The solidified membrane is transferred from coagulation bath 29 into a primary leaching bath 38 via a roller 31 above gelation bath 29. The primary leaching bath 38 has two motorized rollers 32 and 33. The fiber is wrapped a dozen times around two parallel rollers 32 and 33 to leach the residual solvent and additives out of the membrane. Then, the fiber is allowed pass over roller 34 and 35 and is finally collected by a take-up wheel immersed in water in a secondary leaching tank 39, the remaining chemical residuals are removed from the membrane at this stage. A laser scan micrometer can be installed between roller 34 and 35 to monitor fiber size and reproducibility. The signal obtained from the laser scan micrometer can be sent back to the dope delivery system to control dope delivery rate. Ultrasonic probes can be installed in both the primary and the secondary leaching bath 38 and 39, respectively. The ultrasonic probe installed in the coagulation bath 29 has significantly enhanced mass transfer and speeded up the phase inversion from liquid to solid during membrane formation. Thus, a composite hollow fiber membrane in the present invention can be produced at a speed much faster than those disclosed in the prior art.

Example 1 illustrates a basic process for making a braid supported hollow fiber membrane in the present invention.

A membrane casting solution (referred to herein as Dope I) is made by mixing 12 parts by weight of poly(vinylidene fluoride-co-hexafluoropropylene) (PVDF-HFP), 5 parts by weight of poly(acrylonitrile-co-methacrylonitrile) particles having an average particle size of 70 micrometer, 4 parts by weight of polyvinylpyrrolidone (PVP), 5 parts by weight of aluminum chloride hexahydrate (AlCl$_3$.6H$_2$O), 2 parts by weight of poly(vinyl butyral-co-vinyl alcohol-vinyl acetate) and 72 parts by weight of 1-methyl-2-pyrrolidinone (NMP) as a solvent. Unlike the calcined α-alumina particles used in the prior art, poly(acrylonitrile-co-methacrylonitrile) particles used in the present invention neither dissolve in NMP nor precipitate from the polymer solution.

A composite hollow fiber membrane is prepared by coating a braid twice with Dope I using a process shown in FIG. 3. A braid used as a membrane support has a tubular geometry, its cross section 20 is schematically shown in FIG. 2. The first coating 22 covers the rough surface of braid and provides a smooth surface for a second coating as displayed in FIG. 2. The second coating 21 seals any defect that the braid may still have after the first coating to form a defect free composite membrane as shown in FIG. 2. The use of the same dope for both the first and the second coating allows eliminate the interface between the first and second coating layers to give a strong adhesion.

In Example 1, ultrasonic sonication is applied to the coagulation bath to enhance mass transfer and to speed up phase inversion process. A composite hollow fiber membrane is produced at a speed of 65 ft/min. A composite membrane obtained has an outside diameter of 78 mil, a water permeability of 142 gfd/psi measured at 10 psi transmembrane pressure, and a rejection of 74% towards poly(ethylene oxide) (PEO) having an average molecular weight of 200,000 daltons as shown in Table 1.

The membrane burst pressure is defined as the pressure at which the membrane is ruptured. This parameter is very important, because the membrane is often cleaned by back flush, the membrane may delaminate (i.e., peel off) from the support if the membrane burst pressure is lower than the pressure applied for back flush cleaning. The composite hollow fiber membrane obtained from Example 1 has a burst pressure over 100 psi. The pressure used for back flush cleaning is normally less than 20 psi. Thus, the membrane obtained from Example 1 is very durable and will not delaminate during back flush cleaning.

The membrane obtained from Example 1 is useful for a variety of applications, such as filtration of orange and lemon juice. The 100% orange juice containing suspended particles, which is sold in a local supermarket under a brand name of Tropicana Pure Premium, is filtered by the membrane to give a yellow retentate (concentrate) and clear filtrate (permeate), the filtrate is full of aroma and less sweet than the original 100% juice to become a delicious diet orange juice. A similar result is obtained from filtering concentrated lemon juice containing suspended particles to give a clear permeate and white cloudy concentrate, the filtrate is a delicious diet lemon juice. In filtration of orange and lemon juice, a secondary dynamic membrane is formed by deposition of fruit particles at membrane surface to give a juice permeability much lower than the water permeability as shown in Table 1.

The membrane obtained from Example 1 can be utilized for concentration of milk and soymilk. Whole milk obtained from a local supermarket is filtered to give a clear permeate. Casein in the milk is retained by the membrane, sucrose, water and ash are allowed pass through the membrane, the concentrated milk obtained can be used to make cheese and other dairy products. A similar result is obtained when filtering soymilk sold in a local supermarket under a brand name of Silk, the filtrate obtained is a light yellow clear solution, the retentate obtained is a white milky solution. Filtration of milk is a convenient experiment to check membrane leakage. If the membrane is leaking, it gives a milky cloudy permeate, otherwise it give a clear permeate. Similarly to filtration of orange and lemon juice, a secondary dynamic membrane is formed in filtration of milk and soymilk to give a milk permeability much lower than the corresponding water permeability as shown in Table 1.

Example 2 illustrates an impact of crosslinked PVP particles on membrane performance. PVP is a water soluble polymer, cross linking makes it no longer soluble in water. Crosslinked PVP particles will swell in the membrane matrix when exposing the membrane to water. In Example 2, the dope having a composition given in Table 2 is prepared in the same way as in Example 1, crosslinked PVP particles are used as additives to replace poly(acrylonitrile-co-methacrylonitrile) particles in Example 1. A composite hollow fiber membrane is also prepared in the same way as in Example 1, but at a higher speed of 76 ft/min. The detail conditions used to make the membrane are given in Table 2. Vacuum suction is applied to draw the dope towards the tubular braid to give a strong adhesion between the membrane and the braid support. As a result, the membrane obtained has a burst pressure higher than 100 psi, and a water permeability of 35 gfd/psi.

A post treatment is carried out by immersing the membrane in a 5,000 ppm sodium hypochlorite solution at ambient temperature for 5 days. The post treatment increases the pure water permeability from 35 to 170 gfd/psi.

The application of the chlorine treated membrane is illustrated by filtering surface water and sewage water. Surface water obtained from Canobie lake, Salem, N.H., is filtered by the chlorine treated membrane to give a Lake water permeability of 62 gfd/psi, the permeate is as clear as pure water and is drinkable. Black stinky sewage water obtained from a local septic was also filtered by the membrane to give a sewage water permeability of 42 gfd/psi, the permeate is as clear as the municipal drinking water and it is dischargeable.

The beauty of adding the crosslinked PVP particles into membrane matrix is to make the membrane hydrophilic, thus resistant to fouling to give a high flux in filtration of lake water and sewage water.

Example 3 further illustrates the impact of both crosslinked PVP particles and poly(acrylonitrile-co-methacrylonitrile) particles on membrane performance. Dope III having a composition given in Table 3 is prepared in the same way as in Example 1. However, both crosslinked PVP particles and poly(acrylonitrile-co-methacrylonitrile) particles are added to increase membrane porosity. A composite hollow fiber membrane is prepared using a spinneret shown in FIG. 1 and a process depicted in FIG. 3. A braid is first coated with Dope III in chamber 11 of the spinneret to cover rough surface and any defect that the braid may have. The braid covered with the first coating layer is coated again with the same dope in chamber 16 of the spinneret to give a defect free composite hollow fiber membrane. The ultrasonic sonication is applied to the coagulation bath to speed up phase inversion process, which allows produce a composite hollow fiber membrane at a speed of 104 ft/min. The ultrasonic sonication is also applied to the primary and secondary leaching baths to remove chemical residuals from the membrane.

Vacuum suction is applied to draw the dope towards the support to give a strong adhesion between the membrane and the support. As a result, the membrane obtained has a burst pressure higher than 100 psi. Contrary to the teaching of U.S. Pat. Nos. 6,354,444 and 4,061,821, the composite hollow fiber membrane obtained in the present invention has a water permeability of 227 gfd/psi, which is much higher than the water permeability of 50 gfd/psi disclosed in the prior art.

The applications of the membrane obtained from Example 3 are demonstrated by filtration of milk, soymilk, lake water, and sewage water.

Surface water obtained from Canobie lake, Salem, N.H., is filtered by the membrane to give a Lake water permeability of 67 gfd/psi, the permeate is as clear as pure water and is drinkable. Black stink sewage water obtained from a local septic is also filtered by the membrane to give a sewage water permeability of 38 gfd/psi, the permeate is clear and dischargeable.

The whole milk purchased from Market Basket is filtered by the membrane to give a milk permeability of 3.8 gfd/psi and a clear permeate.

The soymilk is also filtered by the membrane to give a soymilk permeability of 3.0 gfd/psi and a clear light yellow colored permeate.

The beauty of simultaneously coating the support twice with the same dope is to completely eliminate the defect from the membrane without adding extra cost to manufacturing process compared to a single layer coated membrane in the prior art. The first coating layer in the present invention not only covers the roughness and any defect that the support may have, but also plays a role in binding the membrane with the support together. Vacuum suction used to pull the coating solution towards the support further strengthens the adhesion between the membrane and the support. As a result, the membranes obtained in the present invention show outstanding integrity and excellent performance in filtration of orange and lemon juice and in concentration of milk and soymilk, as well as in purification of lake water and sewage water. The details are given in Tables 1–3 of the present invention.

The use of a commercially available poly(vinyl butyral-co-vinyl alcohol-vinyl acetate) in the present invention to provide hydrophilicity to the membrane allows avoid the time consuming hydrolysis reaction of poly(vinyl acetate) in the prior art. The use of polymer particles in the present invention to provide the membrane with high porosity allows avoid the dope instability problem caused by precipitation of calcined α-alumina particles in the prior art. The use of ultrasonic sonication in the present invention to speed up phase inversion of a membrane coating solution from liquid to solid allows produce a composite hollow fiber membrane at a speed much higher than those disclosed in the prior art. The use of vacuum suction and multiple-layer coating method in the present invention allows produce a strong, durable and defect free composite membrane. Therefore, the present invention produces the superior composite membranes and provides the more advanced processes than the prior art for making said composite hollow fiber membranes.

The following examples illustrate the present invention in details and are not intended to limit the scope of the present invention.

EXAMPLE 1

Effect of Vacuum Suction, poly(acrylonitrile-co-methacrylonitrile) Particles and Multiple Coatings on Membrane Performance All of the chemicals used were purchased from Aldrich Chemicals Inc., Milwaukee, Wis. 53201. A tubular braid used as a membrane support was purchased from Atkins & Pearce Inc. One Braid Way, Covington, Ky. 41017.

A membrane casting solution (referred to herein as Dope I) was prepared by mixing 12 parts by weight of poly (vinylidene fluoride-co-hexafluropropylene) (PVDF-HFP), 5 parts by weight of poly(acrylonitrile-co-methacrylonitrile), 70 micrometer particles, 4 parts by weight of polyvinylpyrrolidone (PVP), 5 parts by weight of aluminum chloride hexahydrate ($AlCl_3 \cdot 6H_2O$), 2 parts by weight of poly (vinyl butyral-co-vinyl alcohol-vinyl acetate), and 72 parts by weight of 1-methyl-2-pyrrolidinone (NMP).

A composite hollow fiber membrane was prepared by coating a tubular braid purchased from Atkins & Pearce Inc. with Dope I using a spinneret shown in FIG. 1 and a process depicted in FIG. 3. Vacuum suction was applied to the inside of the braid to draw the dope towards braid surface to give a strong adhesion between the braid and the coating. Ultrasonic sonication was applied to the coagulation bath using a sonicator, Model VCX, made by Sonic and Materials Inc. 53 Church Hill Road, Newtown, Conn., to speed up phase inversion process. The ultrasonic sonication was also applied to the primary and secondary leaching baths to speed up phase inversion process. The braid was coated at a speed of 65 ft/min, coagulated and leached at 50–55° C. in water to give a composite hollow fiber membrane, which was collected by a take-up wheel immersed in water at ambient temperature.

The membrane obtained was characterized by measuring its diameter, burst pressure, water permeability, and filtration of milk, soymilk, orange juice, and lemon juice. All filtration tests were conducted at ambient temperature, 10 psi transmembrane pressure, and outside-in flow mode, i.e. a liquid was allowed to flow from outside the hollow fiber membrane into its lumen to give a permeate. The orange juice, lemon juice, milk and soymilk were purchased from a local supermarket. The results obtained are summarized in Table 1.

The composite hollow fiber membrane obtained has an outside diameter of 78 mil, a water permeability of 142 gfd/psi measured at 10 psi transmembrane pressure.

A compressed air was applied from inside hollow fiber membrane to determine its burst pressure. The membrane did not rupture at a transmembrane pressure over 100 psi to give a burst pressure of at least 100 psi.

The membrane was used to filter 100% orange juice containing suspended fiber-like particles, which is sold under a brand name of Tropicana, Pure Premium, the membrane gave an orange juice permeability of 1.8 gfd/psi and a clear light yellow colored permeate.

The lemon juice concentrate containing suspended particles was filtered by the membrane, to give a lemon juice permeability of 1.2 gfd/psi and a clear permeate.

The whole milk purchased from Market Basket was filtered by the membrane to give a milk permeability of 1.5 gfd/psi and a clear permeate.

The soymilk was filtered by the membrane to give a soymilk permeability of 1.0 gfd/psi and a clear light yellow colored permeate.

Poly(ethylene oxide) (PEO) molecular weight marker having an average molecular weight of 200,000 daltons was filtered by the membrane. The concentration of PEO in a feed solution and in a permeate was analyzed by total carbon analyzor to give a rejection of 74%. The details are given in Table 1.

EXAMPLE 2

Effect of Vacuum Suction, Crosslinked PVP Particles, and Multiple Layer Coating on Membrane Performance Dope II having a composition given in Table 2 was prepared in the same way as in Example 1. In Example 2, crosslinked PVP particles were used as additives to replace poly(acrylonitrile-co-methacrylonitrile) particles in Example 1. A composite hollow fiber membrane was also prepared in the same way as in Example 1, but at a higher speed of 76 ft/min. The detail conditions used to make the membrane are given in Table 2.

The composite hollow fiber membrane obtained has an outside diameter of 78 mil, a burst pressure higher than 100 psi, and a water permeability of 35 gfd/psi measured at 10 psi transmembrane pressure.

A post treatment was carried out by immersing the membrane in a 5,000 ppm sodium hypochlorite solution at ambient temperature for 5 days, the chlorine treated membrane showed a improved pure water permeability of 170 gfd/psi. Surface water obtained from Canobie lake, Salem, N.H., was filtered by the chlorine treated membrane to give a Lake water permeability of 62 gfd/psi, the permeate is as clear as pure water and is drinkable. Black stinky sewage water obtained from a local septic was also filtered by the membrane to give a sewage water permeability of 42 gfd/psi, the permeate is clear and dischargeable. After filtering the sewage water, the membrane was cleaned with 500 ppm bleach, then used to filter milk to give a milk permeability of 1.1 gfd/psi and a clear permeate. The major results obtained are summarized in Table 2.

EXAMPLE 3

Effect of Both Crosslinked PVP Particles and poly(acrylonitrile-co-methacrylonitrile) Particles on Membrane Performance Dope III having a composition given in Table 3 was prepared in the same way as in Example 1. However, both crosslinked PVP particles and poly(acrylonitrile-co-methacrylonitrile) particles were added to increase membrane porosity. A composite hollow fiber membrane was prepared in the same way as in Example 1, but coated at a higher speed of 104 ft/min. The detail conditions used to make the membrane are given in Table 3. The membrane obtained was characterized and the results obtained are summarized in Table 3.

Although the above illustration and discussion are focused on composite hollow fiber membrane, the formulations, methods and processes discovered in the present invention are applicable to flat sheet composite membranes, large diameter tubular composite membranes and any other composite membrane having a different geometry. Because many possible embodiments can be made without departing from the spirit and scope of the present invention, it is to be understood that all matter herein set forth is for illustration and not for limiting the scope of the present invention.

TABLE 1

| COMPOSITION OF MEMBRANE CASTING SOLUTION (DOPE I) | |
|---|---|
| Poly(vinylidene fluoride-co-hexafluropropylene) (PVDF-HFP) | 12% |
| Poly(acrylonitrile-co-methacrylonitrile), 70 micrometer particles | 5% |
| Polyvinylpyrrolidone (PVP) | 4% |
| Aluminum chloride hexahydrate ($AlCl_3.6H_2O$) | 5% |
| Poly(vinyl butyral-co-vinyl alcohol-vinyl acetate) | 2% |
| 1-Methyl-2-pyrrolidinone (NMP) | 72% |
| COATING CONDITION | |
| Dope Pressure | 90 psi |
| Vacuum suction | Yes |
| $1^{st}$ coating | Dope I |
| $2^{ed}$ coating | Dope I |
| Coagulation bath | Water, 50–55° C. |
| Primary leaching bath | Water, 50–55° C. |
| Secondary leaching bath | Water, ambient temperature |
| Coating speed | 65 ft/min |
| MEMBRANE CHARACTERISTICS | |
| Braid outside diameter | 63 ± 3 mil |
| Membrane outside diameter | 78 ± 3 mil |
| Burst pressure | >100 psi |
| Pure water permeability | 142 gfd/psi |
| Orange juice permeability | 1.8 gfd/psi, permeate clear, light yellow |
| Lemon juice permeability | 1.2 gfd/psi, permeate clear |
| Soymilk permeability | 1.0 gfd/psi, permeate clear, light yellow |
| Milk permeability | 1.5 gfd/psi, permeate clear |
| 200 k PEO rejection | 74% |

TABLE 2

| COMPOSITION OF MEMBRANE CASTING SOLUTION (DOPE II) | |
|---|---|
| Poly(vinylidene fluoride (PVDF) | 13% |
| Polyvinylpyrrolidone, cross linked | 5% |
| Aluminum chloride hexahydrate ($AlCl_3.6H_2O$) | 5% |
| Poly(vinyl butyral-co-vinyl alcohol-vinyl acetate) | 2% |
| 1-Methyl-2-pyrrolidinone (NMP) | 72% |
| COATING CONDITION | |
| Dope Pressure | 100 psi |
| Vacuum suction | Yes |
| $1^{st}$ coating | Dope II |
| $2^{ed}$ coating | Dope II |
| Coagulation bath | Water, 50–55° C. |
| Primary leaching bath | Water, 50–55° C. |
| Secondary leaching bath | Water, ambient temperature |
| Coating speed | 76 ft/min |
| MEMBRANE CHARACTERISTICS | |
| Braid outside diameter | 63 ± 3 mil |
| Membrane outside diameter | 78 ± 3 mil |
| Burst pressure | >100 psi |
| Pure water permeability | 35 gfd/psi |
| POST TREATMENT WITH 5,000 PPM NaOCl AT AMBIENT TEMPERATURE FOR 5 DAYS | |
| Pure water permeability | 170 gfd/psi |
| Canobie Lake water permeability | 62 gfd/psi, permeate clear and potable |

TABLE 2-continued

| | |
|---|---|
| Sewage water permeability | 42 gfd/psi, permeate clear and dischargeable |
| Milk permeability | 1.1 gfd/psi, permeate clear |

TABLE 3

| COMPOSITION OF MEMBRANE CASTING SOLUTION (DOPE III) | |
|---|---|
| Poly(vinylidene fluoride) (PVDF) | 12% |
| Poly(acrylonitrile-co-methacrylonitrile), 70 micrometer particles | 3% |
| Polyvinylpyrrolidone, cross linked (PVP) | 3% |
| Aluminum chloride hexahydrate (AlCl$_3$.6H$_2$O) | 5% |
| Poly(vinyl butyral-co-vinyl alcohol-vinyl acetate) | 2% |
| 1-Methyl-2-pyrrolidinone (NMP) | 75% |
| COATING CONDITION | |
| Dope Pressure | 120 psi |
| Vacuum suction | Yes |
| 1$^{st}$ coating | Dope III |
| 2$^{ed}$ coating | Dope III |
| Coagulation bath | Water, 50–55° C. |
| Primary leaching bath | Water, 50–55° C. |
| Secondary leaching bath | Water, ambient temperature |
| Coating speed | 104 ft/min |
| MEMBRANE CHARACTERISTICS | |
| Braid outside diameter | 63 ± 3 mil |
| Membrane outside diameter | 78 ± 3 mil |
| Burst pressure | >100 psi |
| Pure water permeability | 227 gfd/psi |
| Canobie Lake water permeability | 67 gfd/psi, permeate clear and potable |
| Sewage water permeability | 38 gfd/psi, permeate clear and dischargeable |
| Soymilk permeability | 3.0 gfd/psi, permeate clear, light yellow |
| Milk permeability | 3.8 gfd/psi, permeate clear |

The invention claimed is:

1. A defect free semipermeable composite membrane comprising:
   (i) a support layer which provides mechanical strength and is selected from the group consisting of extruded porous material, non woven material, woven material, braiding material, knitted material, any other rigid or flexible organic or inorganic permeable material,
   (ii) a middle layer bonded to the support layer which covers the rough surface and defects of the support layer, said layer selected from the group consisting of an epoxy, a polyurethane, a silicone, and a combination thereof and provides binding between said support and said barrier layers; and
   (iii) a barrier layer which provides selective separation, said barrier layer consisting of 8–55% by weight of at least one hydrophobic polymer and 1–50% by weight of at least one hydrophilic polymers, 1–50% by weight of at least one polymer particle as an additive, 1–30% by weight of other organic and inorganic additives, and the remaining % by weight solvent, wherein the at least one polymeric particle has a particle size from 0.2 nm to 500 μm, and is selected from the group consisting of cross-linked polyvinylpyrrolidone, poly(acrylonitrile-co-methacrylonitrile), crosslinked polystyrene, polyethylene, polypropylene, crosslinked sulfonated polystyrene, crosslinked poly(4-trimethylamino chloride styrene), crosslinked polyethylenimine, crosslinked poly(4-vinylpyridine), poly(4-vinylpyridine) cross-linked, methyl chloride quaternary salt, crosslinked cellulose acetate, crosslinked anion exchange resin, cation exchange resin, crosslinked sulfonated polysulfone and polyethersulfones and combinations thereof.

2. The membrane of claim 1, wherein said major component of the barrier layer is a hydrophobic polymer and is selected from the group consisting of poly(vinyl chloride), poly(vinylidene chloride-co-vinyl chloride), poly(vinylidene chloride-co-methyl acrylate), poly(vinylidene chloride-co-acrylonitrile-co-methylmethacrylate), poly(vinylidene chloride-co-acrylonitrile), poly(vinylidene fluoride), poly(vinylidene fluoride-co-haxefluropropylene), polysulfone, polyethersulfone, polyetherketone, polyacrylonitrile, polystyrene, poly(acrylonitrile-co-butadiene-co-styrene), polyethylene, polypropylene, and combinations thereof.

3. The membrane of claim 1, wherein said minor component of the barrier layer is a hydrophilic polymer and is selected from the group consisting of poly(vinyl chloride-co-vinyl acetate-co-vinyl alcohol), poly(vinyl chloride-co-vinyl acetate-co-maleic acid), poly(vinyl acetate-co-vinyl alcohol), poly(vinyl-butyral-co-vinylalcohol-co-vinyl acetate), poly(vinyl alcohol-co-ethylene), poly(vinyl alcohol-co-vinyl acetate-co-itaconic acid), poly(vinyl alcohol), poly(vinyl acetate-co-crotonic acid), poly(1-vinylpyrrolidone-co-vinyl acetate), sulfonated polysulfone, cellulose, cellulose acetate, polyvinylpyrrolidone, poly(vinyl pyridine) and combinations thereof.

4. The membrane of claim 1, wherein said composite membrane is in the form of a hollow fiber.

5. The membrane of claim 1, wherein said composite membrane is in the form of a tube.

6. The membrane of claim 1, wherein said composite membrane is in the form of a flat sheet.

7. The membrane of claim 1, wherein said composite membrane is in the form of a sphere.

8. The membrane of claim 1, wherein said membrane has a burst pressure of 10 to 500 psi, a pure water permeability of 1 to 500 gfd/psi, and a rejection of 0 to 100% towards poly(ethylene oxide) molecular weight marker having an average molecular weight of 200,000 daltons.

* * * * *